United States Patent
Morales et al.

(10) Patent No.: US 12,083,962 B2
(45) Date of Patent: Sep. 10, 2024

(54) TAPE HOLDER FOR PORTABLE ELECTRONIC DEVICE

(71) Applicant: Safran Seats USA LLC, Gainesville, TX (US)

(72) Inventors: David Morales, Chihuahua (MX); Juan Audelo, Chihuahua (MX); Luis Eduardo Ornelas, Mexico City (MX)

(73) Assignee: Safran Seats USA LLC, Gainesville, TX (US)

( * ) Notice: Subject to any disclaimer, the term of this patent is extended or adjusted under 35 U.S.C. 154(b) by 227 days.

(21) Appl. No.: 17/772,119

(22) PCT Filed: Oct. 31, 2019

(86) PCT No.: PCT/US2019/059109
§ 371 (c)(1),
(2) Date: Apr. 26, 2022

(87) PCT Pub. No.: WO2021/086372
PCT Pub. Date: May 6, 2021

(65) Prior Publication Data
US 2022/0396215 A1     Dec. 15, 2022

(51) Int. Cl.
*B60R 11/00*     (2006.01)
*B60R 11/02*     (2006.01)
(Continued)

(52) U.S. Cl.
CPC ........ *B60R 11/02* (2013.01); *B64D 11/00152* (2014.12); *B60R 2011/0015* (2013.01);
(Continued)

(58) Field of Classification Search
CPC ............. B60R 2011/0071; B60R 11/02; B60R 2011/0015; B60R 2011/0082; B64D 11/00152

See application file for complete search history.

(56) References Cited

U.S. PATENT DOCUMENTS 6,796,540 B1 * 9/2004 Manceor ................ F16M 11/10
                                                                  248/456
9,038,877 B2 * 5/2015 Bijlholt ................... B60R 11/02
                                                                  224/553
(Continued)

FOREIGN PATENT DOCUMENTS

DE    102016200100 A1    7/2017
GB        2545513 A       6/2017
WO     2015077834 A1     6/2015

OTHER PUBLICATIONS

International Patent Application No. PCT/US2019/059109, International Search Report and Written Opinion, dated May 12, 2020.

*Primary Examiner* — Rodney B White
(74) *Attorney, Agent, or Firm* — Kilpatrick Townsend & Stockton LLP (57) ABSTRACT

Described is a passenger seat (100) having a support (200) for holding a portable electronic device (106) coupled to a seat back (102) of the passenger seat (100). The support (200) includes an upper support (202) having an extendable portion (206) that extends from a housing (204) of the upper support (202), and a lower support (208) coupled to an end of the extendable portion (206). The extendable portion (206) has a retracted position, wherein the extendable portion (206) is located within the housing (204), and an extended position, wherein the extendable portion (206) is disposed outside of the housing (204) such that a passenger can place a portable electronic device (106) within the support (200).

17 Claims, 6 Drawing Sheets

(51) Int. Cl.
  *B64D 11/00* (2006.01)
  *B64D 11/06* (2006.01)
(52) U.S. Cl.
  CPC ............ *B60R 2011/0071* (2013.01); *B60R 2011/0082* (2013.01)

(56) References Cited

U.S. PATENT DOCUMENTS

| | | | |
|---|---|---|---|
| 9,511,862 B2* | 12/2016 | Thiele | B64D 11/00152 |
| 9,764,841 B2* | 9/2017 | Ferris | F16M 11/041 |
| 10,220,796 B2* | 3/2019 | Neumann | B64D 11/00152 |
| 10,259,400 B1* | 4/2019 | Song | B60R 11/0241 |
| 10,414,500 B2* | 9/2019 | Irons | B60R 11/0252 |
| 10,766,620 B2* | 9/2020 | Castaing | B64D 11/00152 |
| 2006/0285306 A1* | 12/2006 | Carnevali | H04M 1/04 361/759 |
| 2007/0022582 A1* | 2/2007 | Carnevali | F16M 11/14 24/523 |
| 2007/0022583 A1* | 2/2007 | Carnevali | B60R 11/0252 24/523 |
| 2008/0296821 A1* | 12/2008 | Carnevali | B25B 5/06 269/164 |
| 2009/0212189 A1* | 8/2009 | Carnevali | B25B 5/02 248/346.04 |
| 2012/0120626 A1* | 5/2012 | Akaike | B60R 11/02 361/807 |
| 2012/0235001 A1* | 9/2012 | Somuah | B60R 11/0252 248/287.1 |
| 2014/0354002 A1* | 12/2014 | Bisceglia | B60K 35/10 296/37.12 |
| 2016/0362067 A1* | 12/2016 | Jodon De Villeroche | H02J 50/10 |
| 2018/0065567 A1* | 3/2018 | Osterhoff | B60N 2/64 |
| 2018/0079369 A1* | 3/2018 | Catlin | B60R 11/0241 |
| 2018/0198968 A1* | 7/2018 | Heine | F16M 11/041 |
| 2018/0345874 A1* | 12/2018 | Thain | B60R 11/0258 |
| 2019/0202365 A1* | 7/2019 | Medina Huerta | B60R 11/02 |
| 2021/0376633 A1* | 12/2021 | Grout | H02J 7/0044 |
| 2022/0371526 A1* | 11/2022 | Ornelas | B60R 11/02 |

* cited by examiner

TAPE HOLDER FOR PORTABLE ELECTRONIC DEVICE

FIELD OF THE INVENTION

The field of the invention relates to portable electronic device holders for passenger vehicle seats.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rests of the passenger seats. A part of these systems commonly involves a screen, as a visual and/or touch interface, usually located in the back of the seat located before the passengers, and commonly located at an angle and position ideal for the passenger to watch the video screen while seated.

Recently, improvements in other devices such as tablets and smartphones have increased the use of these other devices during flight. With the advent of portable electronic devices ("PEDs"), such as tablet computers, cell phones, smart phones, handheld video game systems, personal digital assistants, palmtop computers, DVD players, data and audio-video media, multi-media enabled devices, and other similar electronic devices, many passengers prefer to use their own PEDs, rather than the OBE or IFE components that are mounted in the passenger seats. The rate at which PEDs, namely cell phones, portable computers, personal digital assistants ("PDAs"), have been evolving has been exponential. These devices are constantly increasing in functions and decreasing/altering in size, making them more portable and, at the same time, able to perform more tasks. This evolution has led to passengers carrying their personal information and media on these devices with the expectation of using them while traveling. Some systems have been developed to enable the use of PEDs in conjunction with a seat back. However, there remains a need for a support system that accommodates existing IFE systems for passengers that do not employ their own PED's.

In order to view such devices, passengers must currently hold the devices, use third-party device holders, or prop the devices on the tray tables, but it is difficult to position the devices at a proper viewing angle. Integrated solutions should accommodate aircraft seat design, which requires that space in front of the passenger be clear of potentially injurious objects and sharp edges. The general goal is to prevent the head trajectory of a passenger, in the case of a crash, from contacting any sharp or protruding edges. As a result, there is a need for a support system for PEDs that is available and adaptable to a wide range of PED sizes, shapes, and thicknesses. There is also a need for a support system that does not pose a safety hazard to passengers. There is also a need for a support system that accommodates a suitable viewing angle, or that can accommodate adjustments to a viewing angle for the comfort of a passenger.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a support for holding a PED comprises an upper support coupled to a seat back, wherein the upper support comprises an extendable portion and a spring device, and a lower support disposed on an end of the extendable portion. The extendable portion may have a retracted position and an extended position, wherein, in the retracted position, the lower support is disposed proximate the upper support, and wherein, in the extended position, the lower support is spaced away from and extends below the upper support. Moreover, the spring device is biased to retain the extendable portion in the retracted position.

In some embodiments, when a force is applied to the extendable portion, the extendable portion extends away from a top portion of the upper support to the extended position.

In some embodiments, the upper support further comprises at least one first projection extending from a bottom surface and the lower support comprises at least one second projection extending upwards from a top surface. The at least one first projection may contact a first end of the PED and the at least one second projection may contact a second end of the PED.

In some embodiments, the lower support further comprises a protrusion pivotable about a rear surface, wherein, when the protrusion is pivoted away from the rear surface, an end of the protrusion contacts the seat back thereby positioning the PED at an angle.

According to certain embodiments of the present invention, a support for holding a PED comprises an upper support. The upper support may comprise a housing coupled to a seat back, an extendable portion having a retracted position and an extended position, and at least one first projection extending from a lower portion of the housing. A lower support may be coupled to an end of the extendable portion and comprise at least one second projection. The at least one first projection may contact an upper end of the PED and the at least one second projection may contact a lower end of the PED when the PED is positioned within the support.

In some embodiments, when the extendable portion is in the extended position, the lower support is spaced away from the housing.

In some embodiments, the upper support further comprises a spring device that is biased to retain the extendable portion in the retracted position. The at least one second projection may extend from an upper surface of the lower support and contact a front surface of the lower end of the PED, while the at least one first projection contacts a top surface of the upper end of the PED.

In some embodiments, the lower support further comprises an angle adjustment member positioned on a rear surface of the lower support, wherein the angle adjustment member has a stowed position and a deployed position. When in the stowed position, the angle adjustment member may be in a vertical position and extend along a rear surface of the extendable portion. When in the deployed position, the angle adjustment member may extend horizontally from the rear surface of the lower support such that an end of the angle adjustment member opposite the rear surface of the lower support contacts the seat back. Moreover, when the angle adjustment member is in the deployed position, the PED may be positioned at an angle with respect to the seat back.

According to certain embodiments of the present invention, a support for holding a PED comprises an upper housing coupled to a seat back. The upper housing may comprise a spring device, an extendable portion having a retracted position and an extended position, and at least one first projection extending from a lower surface of the upper housing. The support may further comprises a lower support having at least one second projection extending from an upper surface, wherein the lower support is coupled to the extendable portion. The at least one first projection may contact an upper end of the PED and the at least one second projection may contact a lower end of the PED when the PED is positioned within the support. A spring force generated by the spring device may bias the extendable portion to the retracted position and create a pressure between the PED and the at least one first projection when the PED is positioned within the support.

In some embodiments, the lower support further comprises a ledge extending horizontally from a forward portion of the lower support. The lower end of PED may contact a bottom portion of the ledge, and a front surface of the lower end contacts an upward extending portion of the ledge.

In some embodiments, the support further comprises a pivotable rod extending from the lower support, wherein the pivotable rod has a stowed position and a deployed position. When the pivotable rod is in the stowed position, the pivotable rod may extend vertically along the extendable portion, and, when the pivotable rod is in the deployed position, the pivotable rod may extend radially outward from the lower support such that an end of the pivotable rod contacts the seat back. Moreover, when the pivotable rod is in the deployed position, the PED is positioned at an angle with respect to the seat back.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide PED holders for passenger seats. While the PED holders are discussed for use with aircraft seats, they are by no means so limited. Rather, embodiments of the PED holders may be used in passenger seats or other seats of any type or otherwise as desired.

According to certain embodiments of the present invention, as shown in FIGS. 1-7, a seat 100 comprises a support 200 for holding a PED 106 coupled to a seat back 102.

In some embodiments, as illustrated in FIGS. 1-4, the seat 100 comprises a seat back 102 with a video shroud 108 having a monitor 110. The seat 100 may include a tray table 104 that pivots between a stowed position, wherein the tray table 104 is positioned in a vertical orientation along the seat back 102, and a deployed position, wherein the tray table 104 is positioned perpendicular to the seat back 102 such that a passenger can place articles on the tray table 104. In some embodiments, the support 200 is positioned on the seat back 102 below the video shroud 108. The support 200 may be positioned on the seat back 102 such that it is behind the tray table 104 when the tray table 104 is in the stowed position. Alternatively, the support 200 may be positioned such that the support 200 is located above the tray table 104 when the tray table is in the stowed position thereby allowing a passenger access to the support 200 when the tray table 104 is in the stowed position.

In some embodiments, as illustrated in FIGS. 1-5 and 7, the support 200 comprises an upper support 202 having an extendable portion 206 and a lower support 208. The upper support 202 may include a housing 204 and a spring device 224 located within the housing 204. The spring device 224 may be a torsion spring, compression spring, extension spring, linear spring, or any other suitable spring device. Moreover, the upper support 202 may include a locking mechanism 216 disposed on a front surface of the housing 204, which can be used to lock the support 200 in a particular position, which will be discussed in further detail. In some embodiments, as illustrated in FIGS. 1-2, 4, and 7, the locking mechanism 216 is a push button. However, the locking mechanism 216 may be other types of locking mechanisms, such as a toggle, a switch, a pulling member, or any other suitable mechanism. The lower support 208 may be coupled to an end of the extendable portion 206. In some embodiments, the lower support 208 includes a tab 214. The tab 214 may be an additional structure that is coupled to the lower support 208 by any suitable means. For example, the tab 214 may formed of fabric, plastic, metal, or any other suitable material, and attached via hook and loop fasteners, welding, gluing, or any other suitable attachment means. Alternatively, the tab 214 may be integrally formed with the lower support 208.

The upper support 202 and the lower support 208 may be formed of materials, including, but not limited to, aluminum, stainless steel, polycarbonate, polypropylene, other metallic materials, composite materials, or any other suitable material. Moreover, the upper support 202 and the lower support 208 may be formed of the same material or different materials.

In some embodiments, the extendable portion 206 is formed of any flexible and durable material that is capable of being extended and folded when stowed. For example, the extendable portion 206 may be formed of a fabric material, such as nylon. However, the extendable portion 206 may be formed of other suitable materials, including, but not limited to, rubber, thermoplastic polyurethane, flexible sheet metal, acrylic, polycarbonate, high density polyethylene, or any other suitable material.

Figure 1:
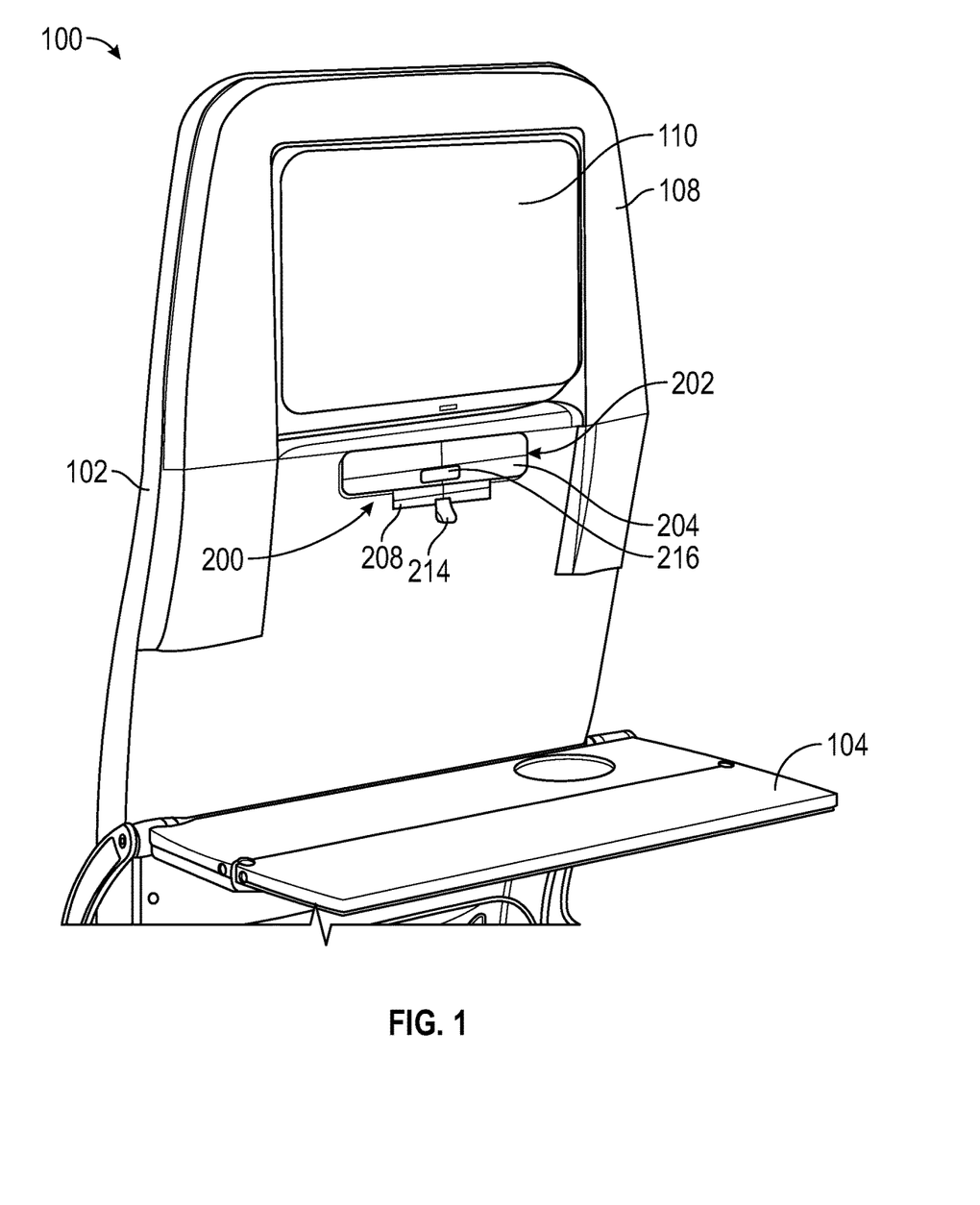
FIG. 1 is a perspective view of a passenger seat with a support for a PED in a retracted position, according to certain embodiments of the present invention.
Figure 2:
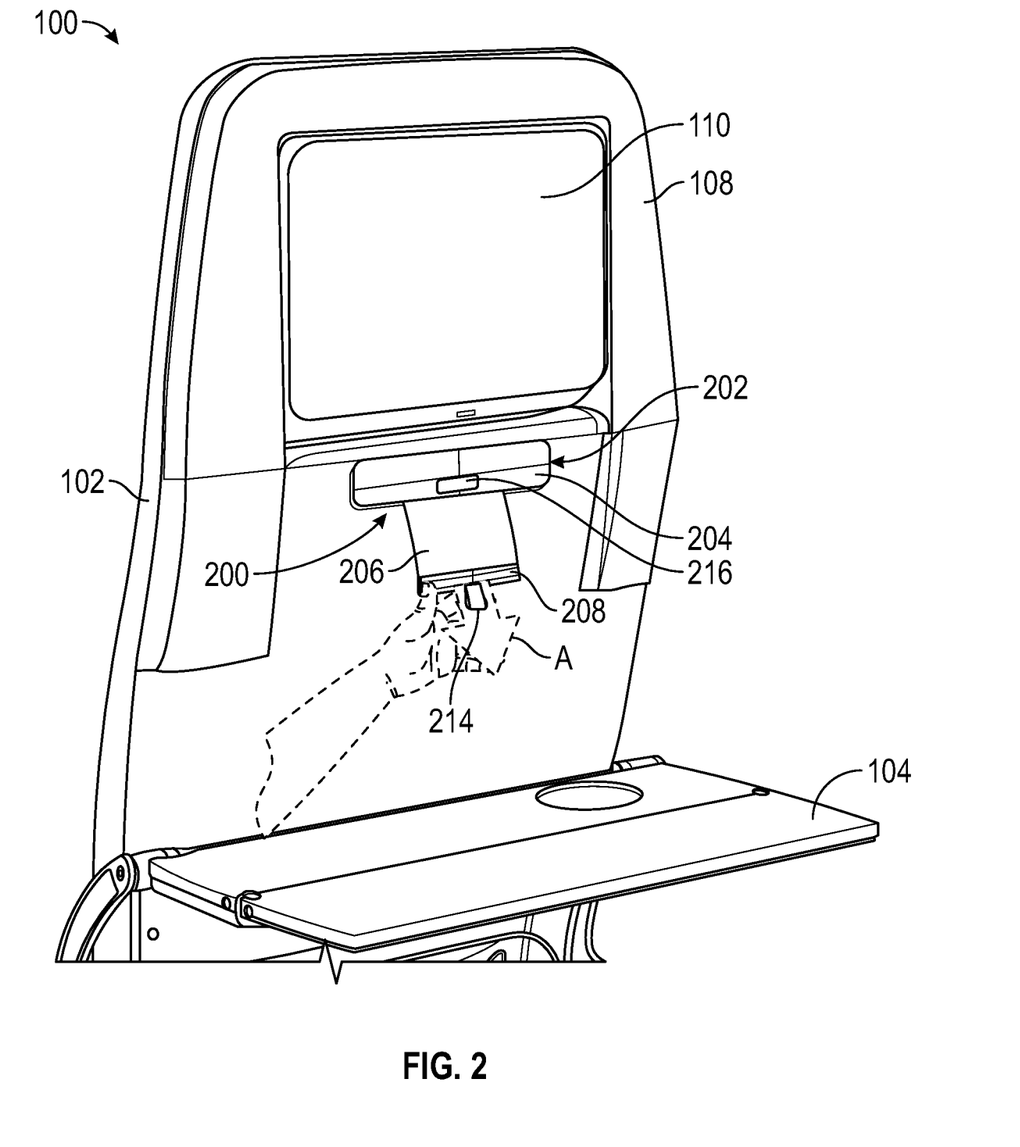
FIG. 2 is a perspective view of the passenger seat of FIG. 1 illustrating the support in an intermediary position.
Figure 3:
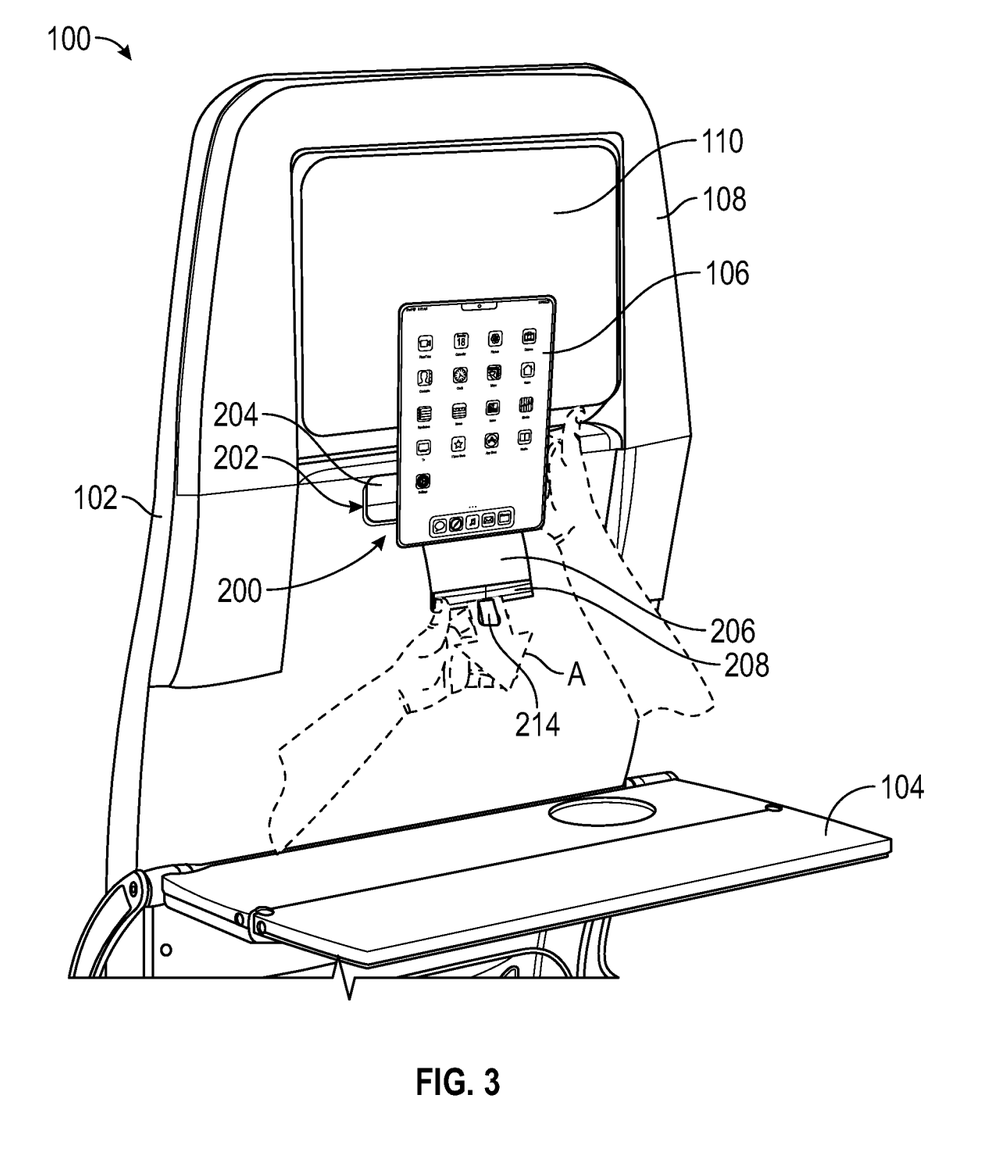
FIG. 3 is a perspective view of the passenger seat of FIG. 1 illustrating the installation of a PED.
Figure 4:
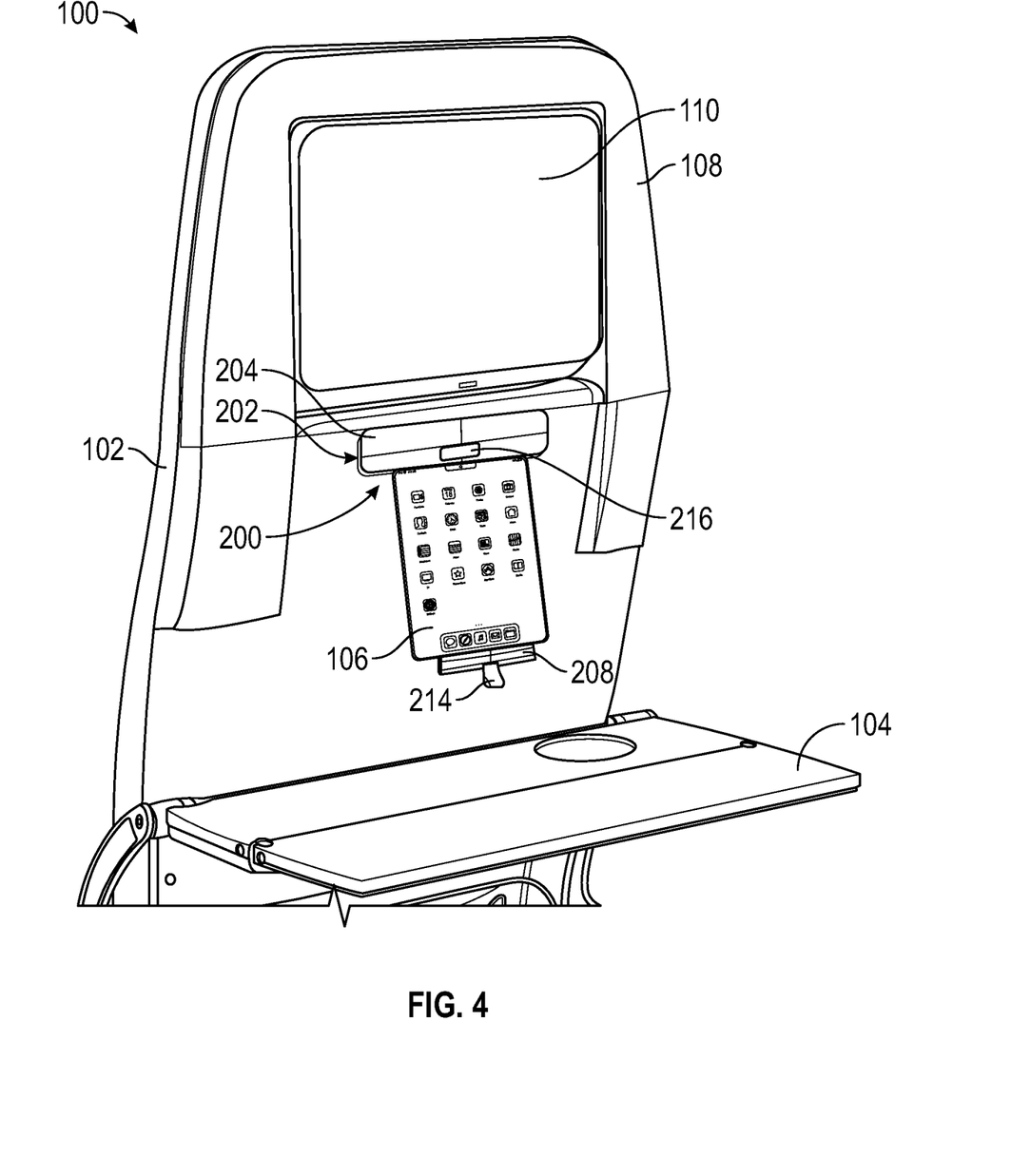
FIG. 4 is a perspective view of the passenger seat of FIG. 1 illustrating the support in an extended position.

In some embodiments, as illustrated in FIGS. 2-4, the extendable portion 206 has a retracted position and an extended position. Turning to FIG. 1, when the extendable portion 206 is in the retracted position, the extendable portion 206 is located within the housing 204 of the upper support 202 and the lower support 208 is disposed proximate the upper support 202 such that lower support 208 may contact the housing 204. The spring device 224 may comprise a spring that biases the extendable portion to the retracted position. When the extendable portion 206 is in the extended position, as illustrated in FIG. 4, the extendable portion 206 may be disposed outside of the housing 204 of the upper support 202 and the lower support 208 may be positioned such that it is spaced away from the housing 204 of the upper support 202. When the extendable portion 206 is in the extended position, a passenger may place a PED 106 within the support 200. A length of the extendable portion 206 in the extended position may vary such that the support 200 is capable of accommodating a PEDs 106 of different sizes, shapes, and thicknesses. For example, the length of the extendable portion 206 may range between 0 mm to 240 mm. However, the length of the extendable portion 206 may vary depending upon a particular passenger seat upon which the support 200 is installed. Similarly, the extendable portion 206 may have a width that ranges between 3 to 5 inches, so as to accommodate PEDs 106 of different sizes and shapes as well as provide stability and support to the PED 106.

FIGS. 2-4 illustrate the operation of the support 200 according to an embodiment of the present invention. In some embodiments, the support 200 has an initial position wherein the extendable portion 206 is contained within the housing 204 and the lower support 208 contacts the housing 204. This is due to a spring force caused by the spring device 224, which biases the extendable position to the retracted position, as described above. To begin, the passenger may grip the tab 214 and pull the lower support 208 downwards in the direction of arrow A, as illustrated in FIG. 2. When the passenger pulls the lower support 208 with enough force to overcome the spring force of the spring device 224, the lower support 208 begins to move downwards in the direction of arrow A. As the passenger pulls the lower support 208 in the direction of arrow A, the extendable portion 206 moves from the retracted position to the extended position such that the extendable portion 206 is disposed outside of the housing 204 of the upper support 202. When the passenger reaches a point that a desired length of the extendable portion 206 is exposed outside of the housing 204 (i.e., the extended position), the user may secure the PED 106 within the support 200 (to be described in further detail). Once the PED 106 is placed within the support 200, the force of the spring device 224 causes the extendable portion 206 to return towards the retracted position such that the lower support 208 moves back towards the housing 204. When an upper end of the PED 106 contacts the housing 204 of the upper support 202 the extendable portion 206 will be unable to continue to the retracted position, thereby securing the PED 106 between the upper support 202 and the lower support 208. Additionally, during operation of the support 200, the passenger may activate the locking mechanism 216, for example by pressing the push button, to lock the extendable portion 206 in any intermediary position between the retracted position and the extended position.

Figure 5A:
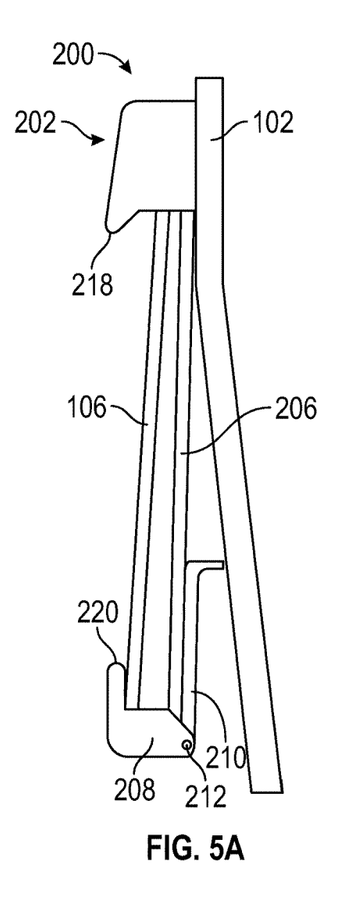
FIG. 5A-C are side views of the support of FIG. 1 illustrating the movement of an angle adjustment member between stowed and deployed positions.
Figure 5B:
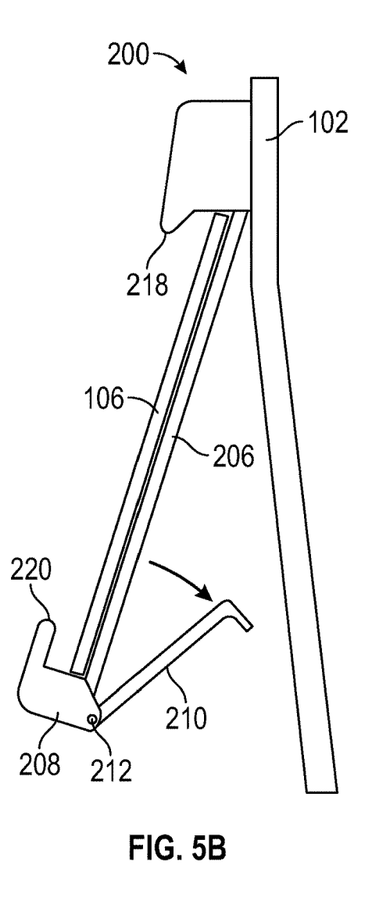
Figure 5C:
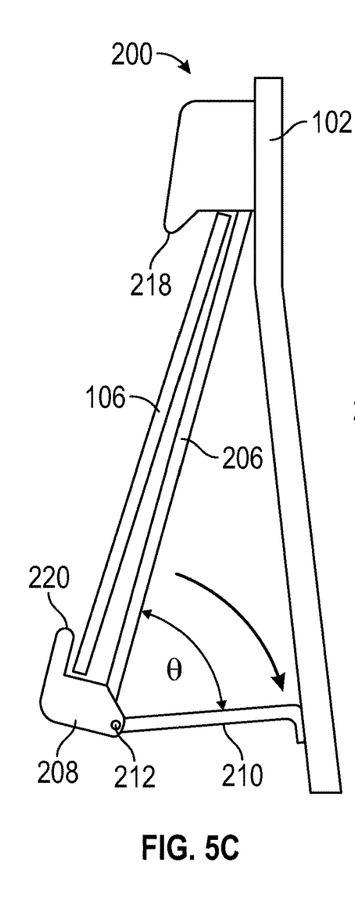

In some embodiments, as illustrated in FIGS. 5A-5C, the housing 204 of the upper support 202 includes at least one first projection 218 that extends downward from a lower surface of the housing 204 thereby creating an overhang. A distance between a rear end of the upper support 202 where the upper support is coupled to the seat back 102 and the at least one first projection 218 may be any suitable distance to accommodate a variety of PEDs 106 that range in size, shape, and thickness. For example, the distance may range between 4 to 6 inches. Additionally, the lower support 208 may include at least one second projection 220 that extends from an upper surface of the lower support 208. In some embodiments, the at least one second projection 220 is a ledge that extends horizontally from a front end of the lower support 208 and comprises an upward extending portion similar to that of the at least one second projection 220. As described above with the respect to the upper support 202, a distance between a rear end of the lower support 208 and the at least one second projection 220 may be any suitable distance to accommodate a variety of PEDs 106 that may range in size, shape, and thickness. For example, the distance may range between 0.5 to 0.75 inches. In some embodiments, when the PED 106 is secured within the support 200, as described above, the lower end of the PED 106 is positioned within lower support 208 and the upper end of the PED 106 is positioned within the upper support 202. In particular, the lower end of the PED 106 may be positioned such that a front surface of the lower end of the PED 106 contacts the at least one second projection 220. The upper end of the PED 106 may be positioned such that a top surface of the upper end of the PED 106 contacts the at least one first projection 218. In some embodiments, a front surface of the upper end of the PED 106 may also contact the at least one first projection 218 depending on the size, shape, and thickness of the PED 106. When the PED 106 is positioned within the upper support 202 and the lower support 208, the spring force of the spring device 224 creates a pressure between the PED 106 and the at least one first projection 218 and the at least one second projection 220 thereby securing the PED 106 in the support 200.

Figure 6:
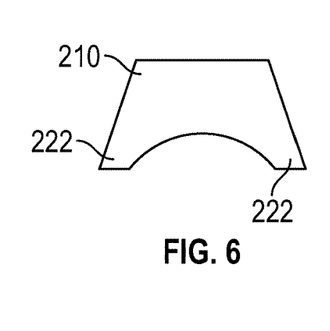
FIG. 6 is a top view of the angle adjustment member of FIGS. 5A-5C.
Figure 7:
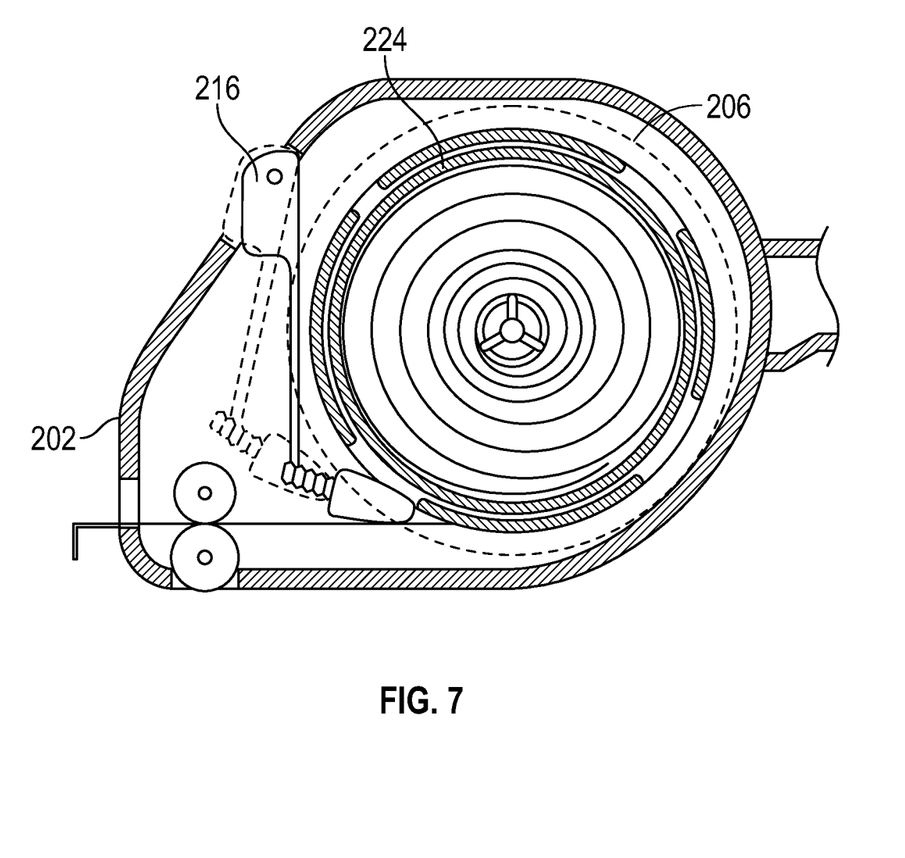
FIG. 7 is a cross-sectional view of the support of FIG. 1 illustrating a spring mechanism according to certain embodiments of the present invention.

In some embodiments, as illustrated in FIGS. 5A-5C, the lower support 208 comprises an angle adjustment member 210 pivotably coupled to the lower support 208 for adjusting the angle at which the PED 106 is positioned relative to the seat back 102. The angle adjustment member 210 may be a protrusion, a rod, or any other suitable member that is integrally formed with the lower support 208. Alternatively, the angle adjustment member 210 may be a separate structure, for example, but not limited to a protrusion, a rod, or any other suitable structure, that is coupled to a rear portion of the lower support 208 at a pivot point 212. In some embodiments, as illustrated in FIG. 6, the angle adjustment member 210 includes at a pair of angle adjustment projections 222 extending from a rear portion of the angle adjustment member 210. While two angle adjustment projections 222 are illustrated, the angle adjustment member 210 may include only one angle adjustment projection 222. Alternatively, the angle adjustment member 210 may include more than two angle adjustment projections 222, for example, there may be three or more angle adjustment projections 222. Moreover, the angle adjustment projections 222 may be integrally formed with a body of the angle adjustment member 210. Alternatively, the angle adjustment projections 222 may be formed as separate structures and coupled to the body of the angle adjustment member 210 by any suitable means, for example, hook and loop fastener, welding, crimping, gluing, or any other suitable means.

The angle adjustment member 210 may be formed of any of the materials described above, including, but not limited to, aluminum, stainless steel, polycarbonate, polypropylene, other metallic materials, composite materials, or any other suitable material.

In some embodiments, as illustrated in FIGS. 5A-5C, the angle adjustment member 210 is pivotable between a stowed position and a deployed position. In the stowed position, illustrated in FIG. 5A, the angle adjustment member 210 is positioned substantially vertically such that a top surface of the angle adjustment member 210 is flush with the extendable portion 206. In the deployed position, illustrated in FIG. 5C, the angle adjustment member 210 is positioned substantially horizontal such that the angle adjustment member 210 extends from the rear portion of the lower support member and the angle adjustment projections 222 contact the seat back 102. When the angle adjustment member 210 is in the deployed position, the support 200 may be positioned such that the extendable portion 206, and consequently the PED 106, are positioned at an angle θ with respect to the seat back 102. The angle θ may be any suitable angle that allows the passenger to view the PED 106, for example, the angle θ may range between 30 and 60 degrees. To move the angle adjustment member 210 between the stowed position and the deployed position, the passenger may grip the angle adjustment member 210 via the body or the angle adjustment projections 222 and push and/or pull the angle adjustment member 210 to a desired angle.

In the Following, Further Examples are Described to Facilitate the Understanding of the Invention:

Example A. A support for holding a portable electronic device comprising:
an upper support coupled to a seat back, wherein the upper support comprises an extendable portion and a spring device;
a lower support disposed on an end of the extendable portion;
wherein the extendable portion has a retracted position and an extended position;
wherein, in the retracted position, the lower support is disposed proximate the upper support;
wherein, in the extended position, the lower support is spaced away from and extends below the upper support; and
wherein the spring device is biased to retain the extendable portion in the retracted position.

Example B. A support for holding a portable electronic device of any of the preceding or subsequent examples, wherein, when force is applied to the extendable portion, the extendable portion extends away from a top portion of the upper support to the extended position.

Example C. A support for holding a portable electronic device of any of the preceding or subsequent examples, wherein the upper support further comprises at least one first projection extending from a bottom surface.

Example D. A support for holding a portable electronic device of any of the preceding or subsequent examples, wherein the lower support comprises at least one second projection extending upwards from a top surface.

Example E. A support for holding a portable electronic device of any of the preceding or subsequent examples, wherein the at least one first projection contacts a first end of the portable electronic device and the at least one second projection contacts a second end of the portable electronic device.

Example F. A support for holding a portable electronic device of any of the preceding or subsequent examples, wherein the lower support further comprises a protrusion pivotable about a rear surface of the lower support; and wherein, when the protrusion is pivoted away from the rear surface, an end of the protrusion contacts the seat back thereby positioning the portable electronic device at an angle.

Example G. A support for holding a portable electronic device comprising:
an upper support, wherein the upper support comprises:
a housing coupled to a seat back;
an extendable portion having a retracted position and an extended position;
at least one first projection extending from a lower portion of the housing;
a lower support coupled to an end of the extendable portion and comprising at least one second projection;
wherein the at least one first projection contacts an upper end of the portable electronic device and the at least one second projection contacts a lower end of the portable electronic device when the portable electronic device is positioned within the support.

Example H. A support for holding a portable electronic device of any of the preceding or subsequent examples, wherein, when the extendable portion is in the extended position, the lower support is spaced away from the housing.

Example I. A support for holding a portable electronic device of any of the preceding or subsequent examples, wherein the upper support further comprises a spring device and wherein the spring device is biased to retain the extendable portion in the retracted position.

Example J. A support for holding a portable electronic device of any of the preceding or subsequent examples, wherein the second projection extends from an upper surface of the lower support and contacts a front surface of the lower end of the portable electronic device.

Example K. A support for holding a portable electronic device of any of the preceding or subsequent examples, wherein the at least one first projection contacts a front surface of the upper end of the portable electronic device.

Example L. A support for holding a portable electronic device of any of the preceding or subsequent examples, wherein the lower support further comprises an angle adjustment member positioned on a rear surface of the lower support; and wherein the angle adjustment member has a stowed position and a deployed position Example M. A support for holding a portable electronic device of any of the preceding or subsequent examples, wherein, when the angle adjustment member is in the stowed position, the angle adjustment member is in a vertical position and extends along a rear surface of the extendable portion.

Example N. A support for holding a portable electronic device of any of the preceding or subsequent examples, wherein, when the angle adjustment member is in the deployed position, the angle adjustment member extends horizontally from the rear surface of the lower support such that an end of the angle adjustment member opposite the rear surface of the lower support contacts the seat back.

Example O. A support for holding a portable electronic device of any of the preceding or subsequent examples, wherein, when the angle adjustment member is in the deployed position, the portable electronic device is positioned at an angle with respect to the seat back.

Example P. A support for holding a portable electronic device comprising:
an upper housing coupled to a seat back, wherein the upper housing comprises:
a spring device;
an extendable portion having a retracted position and an extended position;
at least one first projection extending from a lower surface of the upper housing;
a lower support having at least one second projection extending from an upper surface, wherein the lower support is coupled to the extendable portion;
wherein the at least one first projection contacts an upper end of the portable electronic device and the at least one second projection contacts a lower end of the portable electronic device when the portable electronic device is positioned within the support; and
wherein a spring force generated by the spring device biases the extendable portion to the retracted position and creates a pressure between the portable electronic device and the at least one first projection when the portable electronic device is positioned within the support.

Example Q. A support for holding a portable electronic device of any of the preceding or subsequent examples, wherein the lower support further comprises a ledge extending horizontally from a forward portion of the lower support.

Example R. A support for holding a portable electronic device of any of the preceding or subsequent examples, wherein the lower end of the portable electronic device contacts a bottom portion of the ledge and a front surface of the lower end contacts an upward extending portion of the ledge.

Example S. A support for holding a portable electronic device of any of the preceding or subsequent examples, further comprising a pivotable rod extending from the lower support, wherein the pivotable rod has a stowed position and a deployed position.

Example T. A support for holding a portable electronic device of any of the preceding or subsequent examples, wherein, when the pivotable rod is in the stowed position, the pivotable rod extends vertically along the extendable portion; and
wherein, when the pivotable rod is in the deployed position, the pivotable rod extends radially outward from the lower support such that an end of the pivotable rod contacts the seat back; and
wherein, when the pivotable rod is in the deployed position, the portable electronic device is positioned at an angle with respect to the seat back Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A support for holding a portable electronic device comprising:
an upper support coupled to a seat back, wherein the upper support comprises an extendable portion and a spring device;
a lower support disposed on an end of the extendable portion;
wherein the extendable portion has a retracted position and an extended position;
wherein, in the retracted position, the lower support is disposed proximate the upper support;
wherein, in the extended position, the lower support is spaced away from and extends below the upper support;
wherein the spring device is biased to retain the extendable portion in the retracted position,
wherein the lower support further comprises a protrusion pivotable about a rear surface of the lower support; and
wherein, when the protrusion is pivoted away from the rear surface, an end of the protrusion contacts the seat back thereby positioning the portable electronic device at an angle.

2. The support of claim 1, wherein, when force is applied to the extendable portion, the extendable portion extends away from a top portion of the upper support to the extended position.

3. The support of claim 1, wherein the upper support further comprises at least one first projection extending from a bottom surface.

4. The support of claim 3, wherein the lower support comprises at least one second projection extending upwards from a top surface.

5. The support of claim 4, wherein the at least one first projection contacts a first end of the portable electronic device and the at least one second projection contacts a second end of the portable electronic device.

6. A support for holding a portable electronic device comprising:
an upper support, wherein the upper support comprises:
a housing coupled to a seat back;
an extendable portion having a retracted position and an extended position; and
at least one first projection extending from a lower portion of the housing; and
a lower support coupled to an end of the extendable portion and comprising at least one second projection;
wherein the at least one first projection contacts an upper end of the portable electronic device and the at least one second projection contacts a lower end of the portable electronic device when the portable electronic device is positioned within the support,
wherein the lower support further comprises an angle adjustment member positioned on a rear surface of the lower support, and
wherein the angle adjustment member has a stowed position and a deployed position.

7. The support of claim 6, wherein, when the extendable portion is in the extended position, the lower support is spaced away from the housing.

8. The support of claim 6, wherein the upper support further comprises a spring device and wherein the spring device is biased to retain the extendable portion in the retracted position.

9. The support of claim 6, wherein the second projection extends from an upper surface of the lower support and contacts a front surface of the lower end of the portable electronic device.

10. The support of claim 6, wherein the at least one first projection contacts a top surface of the upper end of the portable electronic device.

11. The support of claim 6, wherein, when the angle adjustment member is in the stowed position, the angle adjustment member is in a vertical position and extends along a rear surface of the extendable portion.

12. The support of claim 6, wherein, when the angle adjustment member is in the deployed position, the angle adjustment member extends horizontally from the rear surface of the lower support such that an end of the angle adjustment member opposite the rear surface of the lower support contacts the seat back.

13. The support of claim 12, wherein, when the angle adjustment member is in the deployed position, the portable electronic device is positioned at an angle with respect to the seat back.

14. A support for holding a portable electronic device comprising:
an upper housing coupled to a seat back, wherein the upper housing comprises:
a spring device;
an extendable portion having a retracted position and an extended position;
at least one first projection extending from a lower surface of the upper housing;
a lower support having at least one second projection extending from an upper surface, wherein the lower support is coupled to the extendable portion;
wherein the at least one first projection contacts an upper end of the portable electronic device and the at least one second projection contacts a lower end of the portable electronic device when the portable electronic device is positioned within the support; and
wherein a spring force generated by the spring device biases the extendable portion to the retracted position and creates a pressure between the portable electronic device and the at least one first projection when the portable electronic device is positioned within the support; and
a pivotable rod extending from the lower support, wherein the pivotable rod has a stowed position and a deployed position.

15. The support of claim 14, wherein the lower support further comprises a ledge extending horizontally from a forward portion of the lower support.

16. The support of claim 15, wherein the lower end of the portable electronic device contacts a bottom portion of the ledge and a front surface of the lower end contacts an upward extending portion of the ledge.

17. The support of claim 14, wherein, when the pivotable rod is in the stowed position, the pivotable rod extends vertically along the extendable portion; and
wherein, when the pivotable rod is in the deployed position, the pivotable rod extends radially outward from the lower support such that an end of the pivotable rod contacts the seat back; and
wherein, when the pivotable rod is in the deployed position, the portable electronic device is positioned at an angle with respect to the seat back.

\* \* \* \* \*